3,426,618
HYDROMECHANICAL MULTISPEED DRIVES
Antonin Hau, Prague, Czechoslovakia, assignor to Ustav pro Vyzkum motorovych Vozidel, Prague, Czechoslovakia
Filed Mar. 24, 1967, Ser. No. 626,372
Claims priority, application Czechoslovakia, Mar. 29, 1966, 2,070/66
U.S. Cl. 74—688                                11 Claims
Int. Cl. F16h 47/08

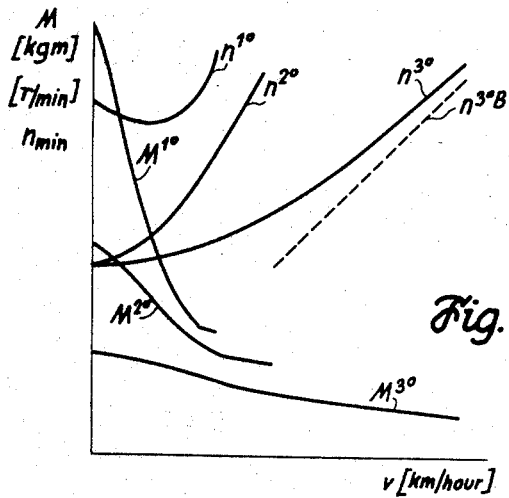
Fig. 7
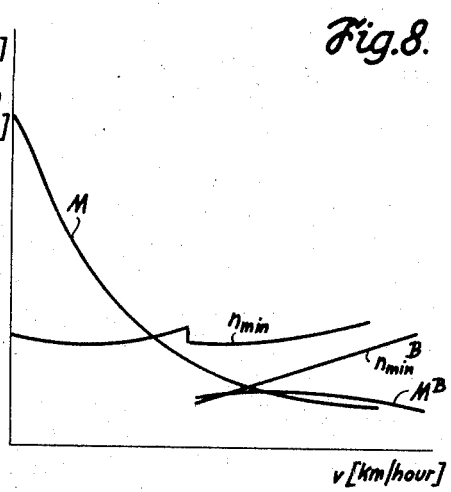
Fig. 8
Fig. 9
|      | S12c | S22c | S18c | B11c | B20c | B19c |
|------|------|------|------|------|------|------|
| N    | −    | −    | −    | −    | −    | −    |
| 1°   | −    | +    | −    | +    | −    | −    |
| 2°   | −    | −    | +    | +    | −    | −    |
| 3°   | +    | −    | +    | +    | −    | −    |
| 3°B  | +    | +    | +    | +    | −    | −    |
| Z    | +    | −    | −    | −    | +    | −    |
| B1   | −    | +    | +    | +    | −    | +    |
| B2   | +    | −    | +    | +    | −    | +    |
| B3   | −    | −    | +    | +    | +    | +    |
Fig. 10
|      | S12e | S22e | S18e | B11e | B20e | B19e | B27e |
|------|------|------|------|------|------|------|------|
| N    | −    | −    | −    | −    | −    | −    | −    |
| 1°   | −    | +    | −    | +    | −    | −    | −    |
| 2°   | −    | +    | −    | −    | −    | −    | +    |
| 3°   | −    | −    | +    | +    | −    | −    | −    |
| 4°   | −    | −    | +    | −    | −    | −    | +    |
| 5°   | +    | −    | +    | −    | −    | −    | −    |
| 5°B  | +    | +    | +    | −    | −    | −    | −    |
| Z1   | +    | −    | −    | −    | +    | −    | −    |
| Z2   | −    | −    | −    | −    | +    | −    | +    |
| B1   | −    | +    | +    | −    | −    | +    | −    |
| B2   | +    | −    | +    | −    | −    | +    | −    |
| B3   | −    | −    | +    | −    | −    | +    | +    |
| B4   | −    | −    | +    | −    | +    | +    | −    |
INVENTOR.
Antonin Hau
BY United States Patent Office 3,426,618
Patented Feb. 11, 1969

ABSTRACT OF THE DISCLOSURE

A multispeed drive having a hydrodynamic torque converter which is driven by the input shaft and drives a first differential gear set. A second or output differential gear set is connected to the first set by a transmission including a brake for arresting an element of the first set and a clutch. The second gear set is also connected to the input shaft for combining hydraulically and mechanically transmitted forces and drives the output shaft. Several modifications to achieve multiple forward and backward transmission ratios are disclosed.

BACKGROUND OF THE INVENTION

The present invention relates to a hydromechanical multispeed drive intended primarily for use with motor vehicles.

This multispeed drive of the invention includes a hydrodynamic torque converter means and at least a pair of differential gear means acted upon by suitable brakes, clutches and freewheels.

Hydromechanical multispeed drives of this general type, presently known, serve to split the torque so that one part thereof is transmitted by a hydrodynamic torque converter while another part thereof is transmitted mechanically. However, these known constructions include the serious drawback of having only a poor amplifying factor which can be obtained by the torque. The greater the proportion of the split torque which is transmitted mechanically, the higher is the efficiency but the lower the amplifying factor. In order to obtain the required torque amplification, the differential section formed by the hydrodynamic torque converter and the output differential gear assembly should be supplemented by further gearing so as to obtain a multiple speed drive. The combination which results is, however, exceedingly complex, particularly as compared to hydromechanical drives of conventional design where the entire torque is transmitted by way of the hydrodynamic torque converter.

SUMMARY OF THE INVENTION

It is, therefore, a primary object of the invention to avoid the above drawbacks by providing a hydromechanical multispeed drive which is not exceedingly complex while at the same time making it possible to achieve desirable torque amplification without sacrificing efficiency.

In particular, it is an object of the invention to provide a hydrodynamic multispeed drive having one or more reverse speeds and enabling the hydrodynamic torque converter to be used with high efficiency for deceleration purposes while at the same time maintaining an adequate amplification factor, with a continuous drag curve if desired.

In accordance with the invention, the hydrodynamic multispeed drive includes a hydrodynamic torque converter means and an output differential gear means. An output means is driven by the output differential gear means for providing the output of the drive, and an input means is operatively connected with the torque converter means for driving the latter. This torque converter means provides a hydraulic drive and is operatively connected with a hydraulically driven differential gear means for driving the latter. A transmission means is interposed between and transmits a drive between the pair of differential gear means, and this transmission means includes at least one brake coacting with at least part of the hydraulically driven differential gear means for holding and releasing the latter part thereof, the transmission means further including at least one clutch interposed in at least part of the transmission between the pair of differential gear means for interrupting the transmission at said part of said transmission means when the clutch is disengaged and for continuing the transmission at the latter part of the transmission means when this clutch is engaged.

BRIEF DESCRIPTION OF THE DRAWINGS

The invention is illustrated by way of example in the accompanying drawings which form part of this application and in which:

FIGS. 7 and 8 respectively illustrate drag curves correlated to engine speed for a pair of different embodiments of the drive of the invention; and FIGS. 9 and 10 summarize in tabular form the operation of the drives which are respectively illustrated in FIGS. 3 and 5.

DESCRIPTION OF PREFERRED EMBODIMENTS

Figure 1:
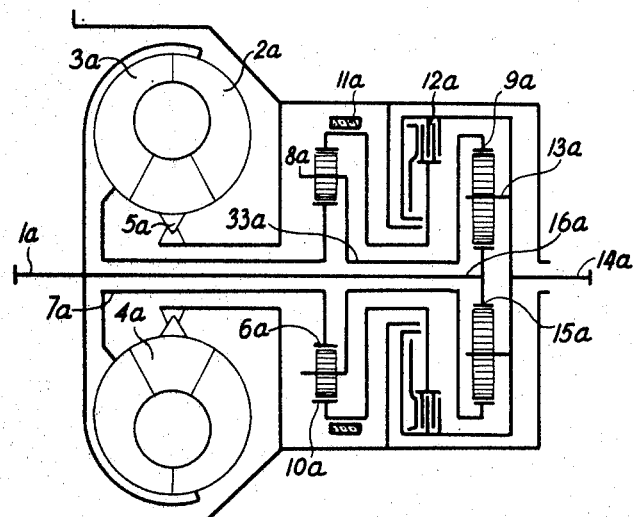
FIGS. 1–6 respectively illustrate, schematically, different possible embodiments of hydromechanical multispeed drives of the invention.

Referring now to FIG. 1, the hydromechanical multispeed drive illustrated schematically therein shows a basic arrangement of the invention. An input means is provided by way of the engine-driven shaft 1a. This input means is operatively connected with the hydrodynamic torque converter means formed by the rotary impeller or pump wheel 2a which hydraulically drives the turbine wheel 3a of the hydrodynamic torque converter means. Thus, this hydrodynamic torque converter means is driven directly from the input means 1a. The hydrodynamic torque converter means further includes a rotary reactor wheel 4a interposed between the impeller 2a and the turbine wheel 3a and connected to the housing of the drive by way of a freewheel 5a in the form of an overrunning clutch or similar one-way drive assembly limiting the reactor 4a to rotation in only one direction with respect to the housing of the drive.

The turbine wheel 3a of the hydrodynamic torque converter means is operatively connected directly with the sun gear 6a of a hydraulically driven differential gear means, and for this purpose a hollow shaft 7a directly interconnects the output or turbine wheel 3a of the hydrodynamic torque converter with the sun gear 6a of the hydraulically driven differential gear means. This hydraulically driven differential gear means includes, in addition to the sun gear 6a, a plurality of planetary gears which surround and mesh with the sun gear 6a, these planetary gears being carried by a rotary spider 8a. The planetary gears are surrounded and in mesh with an outer ring gear 10a of the hydraulically driven differential gear means.

A hollow shaft 33a forms part of a transmission means for transmitting a drive between the hydraulically driven differential gear means and an output differential gear means which includes an outer ring gear 9a of the output differential gear means. Thus, the hollow shaft 33a is coaxial with the hollow shaft 7a and extends between the spider 8a and the ring gear 9a. The output differential gear means includes, in addition to the outer ring gear 9a, a plurality of planetary wheels carried by a spider 13a and meshing with and surrounded by the ring gear 9a. These planetary gears of the output differential gear means are distributed about and mesh with a sun gear 15a of the output differential gear means. The transmission means between the pair of differential gear means further includes a brake 11a for the forward speed gears, this brake coacting with the ring gear 10a for holding and releasing the latter, and in addition this transmission means between the pair of differential gear means includes a clutch 12a which is a direct drive clutch coupling the ring gear 10a to the spider 13a. This spider 13a is operatively connected with an output means 14a in the form of an output shaft of the drive which serves, for example, to drive wheels of the vehicle so that the drive is taken from the drive of the invention by way of the output shaft 14a. A connecting means connects the input means 1a directly to the sun gear 15a, and this connecting means takes the form of a shaft 16a extending through the hollow shafts 7a and 33a and connected directly with the sun gear 15a and the input 1a.

During operation, the torque from the engine enters the drive of the invention by way of the input shaft 1a and is transmitted therefrom to the impeller or pump wheel 2a of the hydrodynamic torque converter means. Also, the drive is mechanically transmitted directly from the input shaft 1a through the shaft 16a to the sun gear 15a of the output differential gear means which serves to combine both the hydraulic and mechanical driving forces. The driven turbine wheel 3a of the torque converter means serves to transmit the torque to the hollow shaft 7a by means of which the gear 6a is driven.

When the first speed gear is engaged, the ring gear 10a of the hydraulically driven differential gear means is blocked against rotary movement by engagement of the brake 11a of the forward speed gears, this brake 11a forming part of the transmission means between the pair of differential gear means, and at the same time the clutch 12a is disengaged so that the torque is transmitted by way of the spider 8a through the hollow shaft 33a to the ring gear 9a of the output differential gear means, and after this hydraulic driving force is combined with the mechanical driving force delivered to the output differential gear means by its sun gear 15a, the combined drive is delivered by way of the spider 13a to the output means 14a. When the second forward speed gear is engaged, the brake 11a is released and the clutch 12a is engaged, so that torque is transmitted by the spider 8a and the hollow shaft 33a to the ring gear 9a. When this hydraulic driving force is combined with the mechanical driving force delivered to the output differential gear means by the sun gear 5a, the combined torque is delivered by the spider 13a in part to the output and in part to the ring gear 10a of the hydraulically driven differential gear means.

Figure 2:
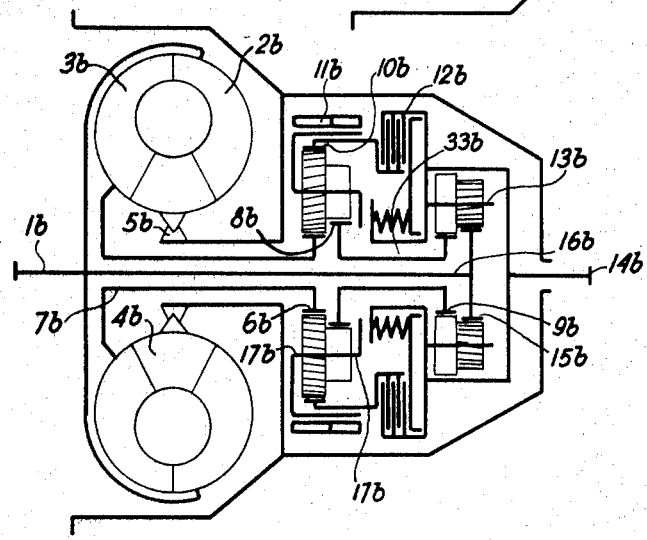

FIG. 2 represents schematically an alternative embodiment of the hydromechanical multispeed drive of the invention similar to that of FIG. 1 but having different differential gear arrangements designed to achieve low gear ratios which are particularly advantageous, inter alia, for passenger automobiles. Those parts of FIG. 2, which corresponds to similarly operating parts of FIG. 1, are designated by the same reference numerals followed by the letter b.

In this embodiment the hydraulically driven differential gear means includes twin planetary wheels, an outer ring gear 10b, and a pair of sun gears 6b and 8b. The output differential gear means acts as a face type of differential gearing having meshing planetary wheels and two sun gears 9b and 15b. From the input means formed by the shaft 1b the torque is transmitted to the pump or impeller wheel 2b of the hydrodynamic torque converter means, and from the latter to the turbine wheel 3b which drives the hollow shaft 7b that serves in turn to drive the sun gear 6. At the same time a connecting means, provided by way of the shaft 16b, serves to provide a mechanical transmission directly from the input means 1b to the sun gear 15b. When the spider 17b of the hydraulically driven planetary gear means of this embodiment is blocked against rotary movement by engagement of the brake 11b of the forward speed gears, the drive will be transmitted by way of the sun gear 8b and the hollow shaft 33b to the sun gear 9b of the output differential gear means. At the latter this hydraulic driving force is united with the mechanical driving force delivered through the sun gear 15b, and from the spider 13b the combined hydraulic and mechanical driving forces are delivered to the output means 14b. When the second speed gear is rendered operative, the brake 11b is disengaged and the clutch 12b is engaged so that torque is transmitted by the sun gear 8b and the hollow shaft 33b to the sun gear 9b of the output differential gear means. When this hydraulic driving force is combined with the mechanical driving force delivered to the output differential gear means by its sun gear 15b part of the torque is returned from the output means 14b to the ring gear 10b of the hydraulically driven differential gear means.

Figure 3:
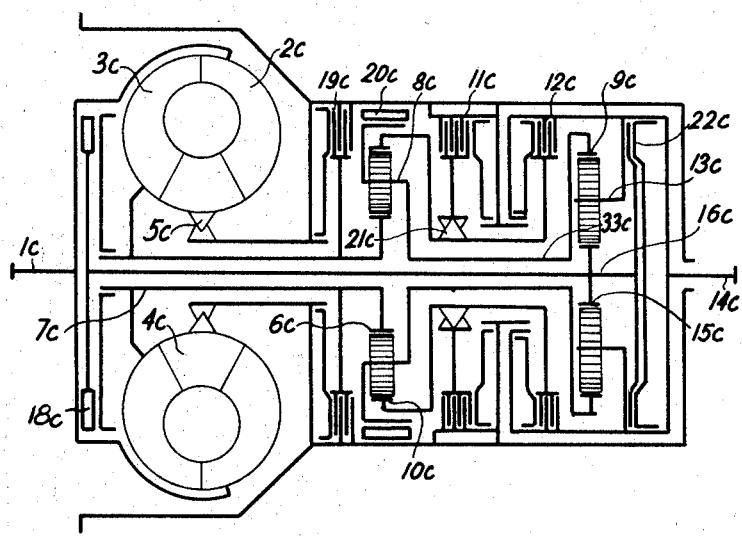

FIG. 3 schematically illustrates a further embodiment of a hydromechanical multispeed drive of the invention, this embodiment being similar to that of FIG. 1 and having like parts designated by the same reference numerals followed by the letter c. All of the components of the embodiment of FIG. 3 are similar to that of FIG. 1 with the following exceptions:

An additional clutch 18c is provided in the mechanical transmission section, this clutch 18c permitting disengagement of the input shaft 1c from the shaft 16c which forms the connecting means for directly transmitting the mechanical driving force to the sun gear 15c. A brake 19c is provided for deceleration purposes, this brake 19c being operatively connected through the freewheel 5c and reactor 4c with the turbine wheel 3c, so that when the brake 19c is engaged the turbine wheel 3c cannot rotate A brake 20c for a reversing gear arrangement coacts with the spider 8c of the hydraulically driven differential gear means. A freewheel or one-way drive in the form of a suitable overrunning clutch, or the like, 21c is inserted between the outer ring gear 10c of the hydraulically driven differential gear means and the forward speed brake 11c. Finally, a blocking clutch 22c is provided in the output differential gear means for blocking rotary movement of the sun gear 15c when this clutch 22c is engaged while releasing the sun gear 15c for rotary movement when the clutch 22c is disengaged.

The drive which is illustrated in FIG. 3 is capable of providing three speeds, and the operation of this drive is indicated in a tabular manner in FIG. 9. In FIG. 9 the vertical columns respectively designate, from left to right, the engagement and disengagement of the clutches 12c, 22c, 18c, and brakes 11c, 20c and 19c. The minus signs in the several columns indicate when the respective clutches and brakes are disengaged, while the plus signs indicate when these clutches and brakes are engaged. The left column of the table of FIG. 9 indicates, starting at the top, neutral, first, second, and third speeds, direct drive, reverse speed Z, and three successive braking stages B1, B2, and B3.

In the embodiment of FIG. 3 the second speed gear is the same as the first speed gear of the embodiment of FIG. 1 while the third speed gear of FIG. 3 is the same as the second speed gear of the embodiment of FIG. 1. The first speed gear is rendered operative by disengaging the clutch 18c and engaging the blocking clutch 22c while also engaging the brake 11c, so that at the first speed the clutch 22c and the brake 11c are engaged while the remaining clutches and brakes are disengaged. With the parts in this position, the entire torque is transmitted by way of the torque converter means to the sun gear 6c of the hydraulically driven differential gear means, and after being amplified by the latter gear means, the hydraulic driving force is transmitted by way of the spider 8c to the ring gear 9c of the output planetary gear means. From this ring gear 9c the drive is transmitted through the spider 13c to the output 14c, the sun gear 15c at this time being blocked by the clutch 22c which is engaged.

If, simultaneously with the engagement of the clutch 22c and the brake 11c, the clutches 18c and 12c are also engaged, the direct drive position is achieved, and at this time the torque converter is blocked. The reverse gear is engaged by braking the rotary movement of the spider 8c upon engagement of the brake 20c of the reverse gear structure while simultaneously disengaging the clutch 18c, disengaging the blocking clutch 22c, as well as the brake 19c for deceleration and the brake 11c of the forward speed gears. During reverse drive the entire torque is transmitted by way of the hydrodynamic torque converter means to the sun gear 6c of the hydraulically driven differential gear means, and after reversal the drive goes from the ring gear 10c of the hydraulically driven differential gear means through the engaged clutch 12c of the direct drive to the output means 14c. The shaft 16c of the mechanical transmission section rotates freely at this time without transmitting any torque.

Stopping of the rotary movement of the turbine wheel 3c of the hydrodynamic torque converter means by engagement of the brake 19c of the decelerating gearing makes it possible to utilize the hydrodynamic torque converter means for decelerating purposes. Braking can be brought about in three stages which are indicated in the table of FIG. 9. Thus, with the blocking clutch 22c engaged simultaneously with the engagement of the clutch 18c while the brake 20c is disengaged and the brake 11c is engaged, direct drive is applied, and the engine as well as the impeller 2c of the hydrodynamic torque converter means both rotate at the same speed as that of the output means 14c, the entire brake torque being transmitted by the shaft 16c and the clutch 18c through the input means 1c to the engine and on the other hand to the pump or impeller wheel 2c of the hydrodynamic torque converter means which brakes while rotating in a direction opposite to that of the blocked turbine wheel 3c of the hydrodynamic torque converter means.

A second, more intensive braking stage, designated B2 in FIG. 9, is achieved by disengaging the blocking clutch 22c and engaging clutch 12c of the direct drive. The braking torque is then transmitted from the output means 14c to the spider 13c of the output differential gear means on the one hand and on the other hand by way of the clutch 12c of the direct drive, the ring gear 10c of the hydraulically driven differential gear means and the spider 8c thereof to the ring gear 9c of the output differential gear means. The combined torque of the ring gear 9c and of the spider 13c is then transmitted through the sun gear 15c and the clutch 18c to the impeller 2c of the hydrodynamic torque converter means and from the latter by way of the input shaft 1c to the engine. The impeller wheel 2c of the hydrodynamic torque converter means and the engine both advance with respect to or are driven by the output means 14c.

The most intensive, or third braking stage, is achieved, as indicated at B3 in FIG. 9, by simultaneous engagement of the brake 19c of the low ratio and the brake 20c of the reverse speed, while disengaging the clutch 12c of the direct drive and the blocking clutch 22c. The braking torque in this case is transmitted to the spider 13c of the output differential gear means and from the latter to the sun gear 15c. From the sun gear 15c the drive is transmitted through the shaft 16c of the mechanical drive transmission and the clutch 18c of the mechanical drive transmission to the impeller or pump wheel 2c of the hydrodynamic torque converted means and thus to the engine. The overdrive ratio is determined by the ratio between the spider 13c and the sun gear 15c of the output differential gear means with the ring gear 9c held against rotation. At this time the hydraulically driven differential gear means is also stopped against operation.

The freewheel 21c between the ring gear 10c and the brake 11c permits shifting from second to third speed by engaging the clutch 12c, and vice versa, from third to second speed by disengaging the clutch 12c of the direct drive without actuating other members. It is possible to omit the freewheel 21c without producing any change in the operation of the drive of FIG. 3, provided that the clutch 12c and the brake 11c are actuated simultaneously in the manner described above in connection with FIG. 1.

Figure 4:
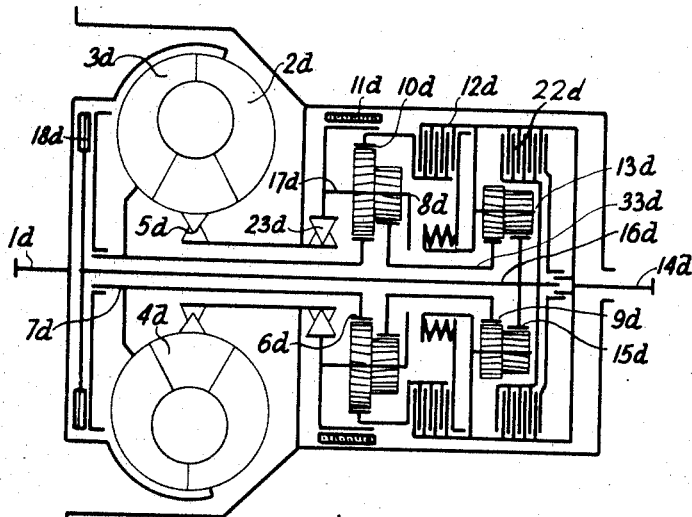

FIG. 4 illustrates a further embodiment of a hydrodynamic multispeed drive of the invention intended primarily for passenger cars. This drive is taken from the design of FIG. 2 but is supplemented with a clutch 18d, a blocking clutch 22d, and a freewheel 23d inserted between the spider 17d of the hydraulically driven differential gear means and the housing of the drive. All the parts of FIG. 4, which correspond to the parts referred to above, are designated by the same reference numerals followed by the letter d. The operation of the embodiment of FIG. 4 is similar to that of FIG. 3 except that the hydrodynamic torque converter means is not utilized for deceleration purposes. During normal braking with the engine, with the lower speed gears engaged, the freewheel 23d between the spider 17d and the housing is bridged by the brake 11d of the forward speeds, which even engages the reverse gear.

Figure 5:
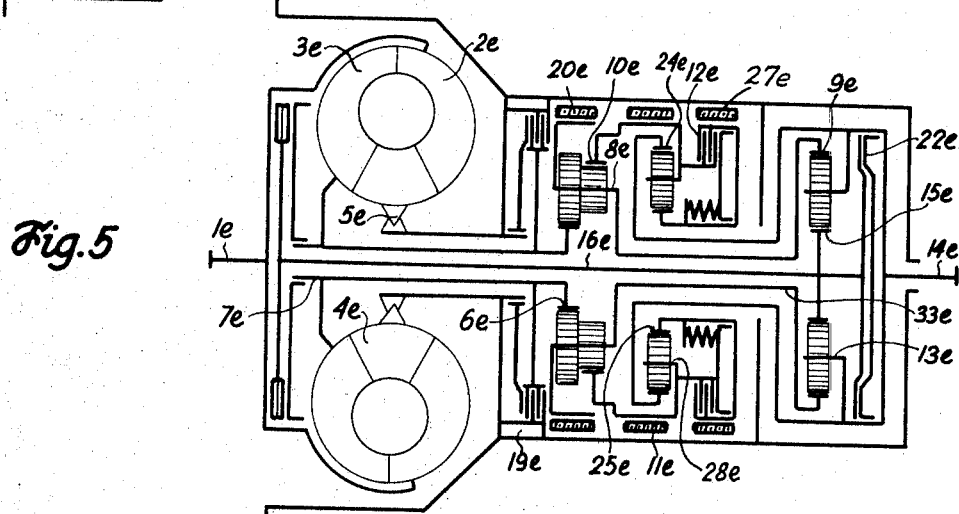

By adding still another differential gear means in the transmission means between the output differential gear means and the hydraulically driven differential gear means, so that the feedback through this transmission takes way through this third differential gear means, interconnecting the output means 14e and the ring gear 10e through the clutch 12e, as shown in FIG. 5, a still further possible construction is achieved for a hydromechanical multispeed drive having four, five, or six speed gears. The parts which are shown in FIG. 5 and which correspond to those referred to above are designated by the same reference numerals, followed by the letter e. The operation of this embodiment is shown in tabular form in FIG. 10. The third or intermediate differential gear means has an outer ring gear 24e connected with the output means 14e, and the sun gear 25e of the third or intermediate differential gear means is connected to the brake 27e of the transmission means between the output differential gear means and the hydraulically driven differential gear means. The spider 28e of the third differential gear means is connected to the outer ring gear 10e of the hydraulically driven differential gear means. The clutch 12e of the direct drive connects the output shaft 14e with the ring gear 10e in that, by connecting the sun gear 25e of the third planetary or differential gear means to the spider 28e, the third or intermediate differential gear means is blocked. The hydraulically driven differential gear means is provided in this embodiment with twin planetary wheels.

This five-speed drive of FIG. 5 operates with full torque transmitted by the hydrodynamic torque converter means for the first two speeds, and at higher speeds the torque is split by the differential action. The first, third and fifth direct and the first reverse speeds are the same as the first, second and third direct and mechanical reverse speeds of the three-speed drive of FIG. 3, except that in the case of the fifth speed of FIG. 5 the brake 11e is disengaged while in the third speed of FIG. 3 this brake 11c is engaged, as is apparent from a comparison of FIGS. 9 and 10. The second speed of FIG. 5 is derived from the first speed, and the fourth speed from the third speed, while the second reverse speed is derived from the first speed in that the ring gear 10e of the hydraulically driven differential gear means is driven by the output means 14e with a ratio determined by the third or intermediate differential gear means. With the embodiment of FIG. 5 four decelerating stages are achievable. The first, second and fourth decelerating speeds are the same as the first, second and third decelerating speeds of FIG. 3 except that in this case also the brake 11e of FIG. 5 is disengaged while the brake 11c of FIG. 3 is engaged. The third decelerating stage of FIG. 5 is taken from the second deceleration stage simply by disengaging the clutch 12e of the direct drive and engaging the brake 27e of the third differential gear means. These functions are clearly apparent from FIG. 10.

A four-speed drive can be derived from the five-speed drive of FIG. 5 simply by omitting the second speed and by providing a suitable selection for the first speed. For example, the hydraulically driven differential gear means could be provided instead with simple planetary wheels, as shown in FIG. 3.

Figure 6:
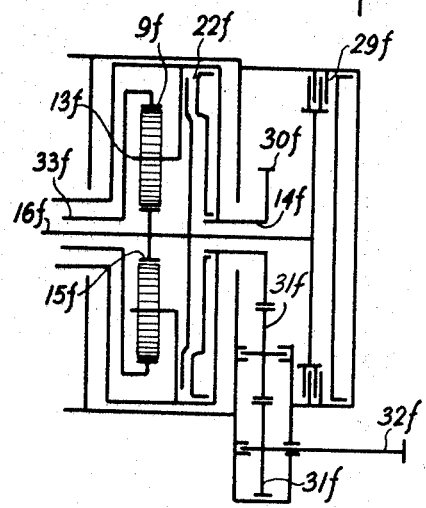

In drives which have no through shaft, the reduction to a further low speed may be achieved by stopping the sun gear 15f of the output differential gear means by the brake 29f, as is shown in the embodiment of FIG. 6 where corresponding parts are indicated by the same reference numerals followed by the letter f. In this case the torque is transmitted from the ring gear 9f of the output differential gear means, this torque first being amplified and then continuing by way of the spider 13f to the output 14f through the gears 30f and 31f of an auxiliary gear transmission to a second output shaft 32f.

Hydromechanical differential-type drives may be built, by way of example, as follows:

For a city bus, a drive according to the layout in FIG. 3 with gears having following numbers of teeth:

| | Teeth |
|---|---|
| Gear 6 | 40 |
| Gear 10 | 72 |
| Gear 15 | 18 |
| Gear 9 | 72 |

The corresponding obtainable gear ratios, by applying a hydrodynamic torque converter having an amplifying factor $K_0 = 3.25$, as as follows:

| | | | |
|---|---|---|---|
| 1° | $i_{I\ mech} = 2.8$ | $i_{I\ total} = 9.1$ |
| 2° | $i_{II\ mech} = 2.06$ | $i_{II\ total} = 4.2$ |
| 3° | $i_{III\ mech} = 1$ | $i_{III\ total} = 2$ |
| 3° B | Blocked torque converter | $i_{III\ B\ total} = 1$ |
| Reverse | $i_{r.\ mech} = -1.8$ | $i_{r.\ total} = -5.8$ |

It is assumed that by using automatic gear shifting the city bus will start with the second mechanical speed gear engaged. Changing over to the first speed gear can take place only by the intervention of the driver (e.g. by the practice of "kicking down"). Advantage will be taken of the simplest possible automatic control which governs a single clutch 12c of the direct drive. If desired, it can also block the torque converter with the blocking clutch 22c of the junction planetary gear set. For the drag curve see FIG. 7.

Using other teeth combinations, e.g.:

| | Teeth |
|---|---|
| Gear 6 | 32 |
| Gear 10 | 68 |
| Gear 15 | 28 |
| Gear 9 | 68 |

The following mechanical and total gear ratios may be obtained with torque converter of $K_0 = 2.6$:

| | | | |
|---|---|---|---|
| 1° | $i_{I\ mech} = 3.12$ | $i_{I\ total} = 8.1$ |
| 2° | $i_{II\ mech} = 1.94$ | $i_{II\ total} = 2.8$ |
| 3° | $i_{III\ mech} = 1$ | $i_{III\ total} = 1.4$ |
| Reverse | $i_{r.\ mech} = -2.12$ | $i_{r.\ total} = -5.5$ |

A vehicle with this type of drive ought to be always started with the first speed gear engaged, and consequently all the three speed gears have to be shifted automatically. The automatic control would be simpler if the blocking clutch 22c were supported by a freewheel. Blocking of the torque converter is not necessary since, with the third mechanical speed gear engaged, the major part of the torque is transmitted mechanically.

When building the drive according to the layout in FIG. 3 with suitably selected blading of the hydrodynamic torque converter and with appropriate mechanical gear trains, a continuous drag curve as shown in FIG. 8 will be obtained. The curve is calculated for a ratio $i = -1.4$ between members 6c and 10c of the reduction planetary gear set and a ratio $i = -3$ between members 15c and 9c of the junction planetary gear set.

The five-speed drive according to FIG. 5 could be constructed with the following gearing:

| | Teeth |
|---|---|
| Gear 6 | 24 |
| Gear 10 | 68 |
| Twin planet wheel | 27 and 17 |
| Gear 15 | 28 |
| Gear 9 | 68 |
| Gear 23 | 34 |
| Gear 24 | 68 |

The corresponding mechanical and total gear ratios are then as follows:

| | | | |
|---|---|---|---|
| 1° | $i_{I\ mech} = 5.5$ | $i_{I\ total} = 17.8$ |
| 2° | $i_{II\ mech} = 2.5$ | $i_{II\ total} = 8.1$ |
| 3° | $i_{III\ mech} = 2.37$ | $i_{III\ total} = 2.9$ |
| 4° | $i_{IV\ mech} = 1.40$ | $i_{IV\ total} = 2$ |
| 5° | $i_{V\ mech} = 1$ | $i_{V\ total} = 1.4$ |
| R₁ | $i_{r.\ mech} = 4.5$ | $i_{r.\ total} = -14.5$ |
| R₂ | $i_{r.2\ mech} = -3$ | $i_{r.2\ total} = -9.8$ |

It is assumed that under normal traffic conditions only the second, fourth and fifth speed gears will be shifted automatically, and only exceptionally will all the speed gears be shifted semi-automatically.

A drive according to the layout in FIG. 4 may be built with the following gearing:

| | Teeth |
|---|---|
| Gear 6 | 20 |
| Gear 8 | 31 |
| Twin planet wheel | 20 and 31 |

Output differential gear means functioning as a differential with a gear ratio of 1:1.

By using a torque converter of $K_0 = 2.2$, the following ratios will be obtained:

| | | | |
|---|---|---|---|
| 1° | $i_{I\ mech} = 2.4$ | $i_{I\ total} = 5.3$ |
| 2° | $i_{II\ mech} = 1.4$ | |
| 3° | $i_{III\ mech} = 1$ | |
| Reverse | $i_{r.\ mech} = 4.1$ | |

I claim:

1. A hydromechanical multispeed drive comprising hydrodynamic torque converter means for providing a hydraulic driving force, output differential gear means for combining hydraulic and mechanical driving forces, output means driven by said output differential means for providing a driving output, input means operatively connected to said hydrodynamic torque converter means for driving the latter, hydraulically driven differential gear means operatively connected to said hydrodynamic torque converter means to be driven thereby, and transmission means extending between both of said differential gear means for transmitting a drive therebetween, said transmission means including at least a brake coacting with part of said hydraulically driven differential gear means for holding and releasing said part thereof and a clutch interposed in the transmission of the drive between said pair of differential gear means for interrupting at least part of the drive transmission therebetween when said clutch is disengaged and for completing said part of said drive transmission therebetween when said clutch is engaged.

2. The combination of claim 1 and wherein said transmission means includes a third differential gear means for transmitting the drive between said output differential gear means and said hydraulically driven differential gear means.

3. The combination of claim 2 and wherein said transmission means includes a second brake coacting with at least part of said third differential gear means for holding and releasing said part of said third differential gear means.

4. The combination of claim 1 and wherein a disengageable blocking clutch means coacts with part of one of said differential gear means for blocking and releasing said part of said one differential gear means.

5. The combination of claim 4 and wherein a connecting means interconnects said input means with said output differential gear means for driving the latter from said input means, said connecting means including a disengageable clutch for interrupting the drive from said input means to said output differential gear means.

6. The combination of claim 1 and wherein said input means is operatively connected with said output differential gear means for driving the latter.

7. The combination of claim 1 and wherein a reversing brake means is operatively connected with part of said transmission means for holding and releasing said part.

8. The combination of claim 1 and wherein a stationary housing houses the components of the drive, and freewheel means interconnecting part of said hydraulically driven differential gear means with said housing.

9. The combination of claim 1 and wherein said transmission means includes a freewheel drive interposed between said brake and said hydraulically driven differential gear means.

10. The combination of claim 1 and wherein said hydrodynamic torque converter means includes a driven turbine wheel operatively connected to said hydraulically driven differential gear means for driving the latter, and decelerating brake means operatively connected to said turbine wheel for holding and releasing the latter.

11. The combination of claim 1 and wherein a connecting means connects said input means with part of said output differential gear means for driving said part of said output differential gear means from said input means, and releasable brake means coacting with said connecting means for holding and releasing the latter so as to hold and release said latter part of said output differential gear means.

References Cited

UNITED STATES PATENTS

| 3,069,925 | 12/1962 | Roche | 74—688 XR |
| 3,073,182 | 1/1963 | Harmon | 74—688 XR |
| 3,209,617 | 10/1965 | Kalversberg | 74—688 |

CARLTON R. CROYLE, *Primary Examiner.*

ALLAN D. HERRMANN, *Assistant Examiner.*